(12) United States Patent
Fukuda

(10) Patent No.: US 10,435,171 B2
(45) Date of Patent: Oct. 8, 2019

(54) NITROGEN ENRICHED AIR SUPPLY SYSTEM AND AIRCRAFT

(71) Applicant: Mitsubishi Aircraft Corporation, Aichi (JP)

(72) Inventor: Koki Fukuda, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 566 days.

(21) Appl. No.: 14/070,753

(22) Filed: Nov. 4, 2013

(65) Prior Publication Data

US 2014/0130894 A1    May 15, 2014

(30) Foreign Application Priority Data

Nov. 9, 2012   (JP) .................................. 2012-247269

(51) Int. Cl.
*F17C 1/00*  (2006.01)
*B64D 37/32*  (2006.01)

(52) U.S. Cl.
CPC ............... *B64D 37/32* (2013.01); *Y02T 50/44* (2013.01); *Y10T 137/2931* (2015.04)

(58) Field of Classification Search
CPC ...... B64D 37/005; B64D 37/08; B64D 37/14; B64D 37/16; B64D 37/18; B64D 37/32; B64D 37/34; B64C 3/34
USPC ............................ 137/571, 576, 565.35, 209
See application file for complete search history.

(56) References Cited

U.S. PATENT DOCUMENTS

| 3,419,233 | A | * | 12/1968 | Wotton ................. | B64D 37/14 244/135 R |
| 3,669,136 | A | * | 6/1972 | Parenti ......................... | 137/113 |
| 4,378,920 | A | * | 4/1983 | Runnels et al. .......... | 244/135 R |
| 5,660,358 | A | * | 8/1997 | Grafwallner ........... | B64D 37/14 137/565.17 |
| 6,547,188 | B2 |  | 4/2003 | Schmutz et al. |  |
| 6,997,415 | B2 | * | 2/2006 | Wozniak ................ | B64D 37/00 244/135 C |
| 7,971,828 | B2 |  | 7/2011 | Massey et al. |  |
| 2003/0218098 | A1 | * | 11/2003 | Goto et al. ................ | 244/135 R |
| 2005/0241700 | A1 | * | 11/2005 | Cozens et al. ............... | 137/587 |
| 2007/0111060 | A1 | * | 5/2007 | Hoffjann et al. .............. | 429/22 |
| 2010/0051749 | A1 | * | 3/2010 | Tanner ..................... | B64C 3/34 244/135 R |
| 2011/0056970 | A1 | * | 3/2011 | Lynas .................... | B64D 37/10 220/745 |
| 2011/0068231 | A1 | * | 3/2011 | Surawski ................. | 244/135 R |
| 2011/0133033 | A1 | * | 6/2011 | Surawski .................. | 244/129.2 |

\* cited by examiner

*Primary Examiner* — Brian M O'Ohara
*Assistant Examiner* — Christopher D Hutchens
(74) *Attorney, Agent, or Firm* — Pearne & Gordon LLP

(57) ABSTRACT

To provide a nitrogen enriched air (NEA) supply system which easily maintains low the concentration of oxygen within a tank before fueling. In the present invention, a subsidiary pipe 20b that directly supplies NEA to a spill-back pipe 23 is provided. In a descent phase of an aircraft, the NEA is supplied to a second fuel tank 17 from the subsidiary pipe 20b. When the second fuel tank 17 is fueled after landing, the stored NEA is pushed out into a first fuel tank 15 through the spill-back pipe 23 by fuel F. Thus, the concentration of oxygen within the first fuel tank 15 can be also maintained low. Accordingly, it is possible to cut out the need for supplying the NEA before fueling, and thereby fuel the fuel tank while avoiding fuel explosion.

15 Claims, 4 Drawing Sheets

TRAVELING DIRECTION

NITROGEN ENRICHED AIR SUPPLY SYSTEM AND AIRCRAFT

BACKGROUND OF THE INVENTION

Field of the Invention

The present invention relates to a system which supplies gas enriched with nitrogen more than air to an aircraft fuel tank.

Description of the Related Art

Since an aircraft fuel tank is filled with vaporized fuel during a flight, it is necessary to prevent explosion of the fuel tank when, for example, the fuel tank is struck by lightning or a short occurs in the wiring. Thus, there has been proposed an explosion-proof system which supplies nitrogen enriched air (referred to as NEA below) having a higher nitrogen concentration and a lower oxygen concentration than air to the fuel tank.

While the air has an oxygen concentration of about 21%, the oxygen concentration of the NEA is set to, for example, 12% or less. To produce the NEA, an air separation module (referred to as ASM below) that uses a permselective membrane having different permeability coefficients for oxygen molecules and nitrogen molecules is employed. Bleed air from a flight engine is used as a supply source of air to be supplied to the ASM.

In the explosion-proof system in which the bleed air is used as the supply source of the NEA, it is necessary to increase the amount of bleed air from the engine so as to increase the amount of NEA to be supplied to the fuel tank. In this case, the fuel consumption of the engine is deteriorated. When the supply of the bleed air is increased, the oxygen concentration tends to become higher (the nitrogen concentration tends to become lower) in relation to the separation performance of the air separation module. For example, when the supply is increased to more than that by which an oxygen concentration of 10% is obtained, the oxygen concentration may be increased to 12% even by using the same air separation module.

U.S. Pat. No. 6,547,188 proposes a process for supplying NEA to an aircraft fuel tank.

In U.S. Pat. No. 6,547,188, the flight phase is divided into a phase from takeoff until entering a descent phase for landing through an ascent phase and a cruising phase (referred to as first phase below), and the descent phase (referred to as second phase below).

In U.S. Pat. No. 6,547,188, a relatively small amount of NEA is supplied in the first phase, and a relatively large amount of NEA is supplied in the second phase. It is described in U.S. Pat. No. 6,547,188 that the supply of the NEA to the fuel tank is increased in the second phase so as to compensate for an increase in the atmospheric pressure since the altitude is lowered in the second phase.

In U.S. Pat. No. 6,547,188, the concentration of the inert gas (typically, nitrogen gas) is set to a relatively high level of, for example, 98% in the first phase, and to a relatively low level of, for example, 86 to 95% in the second phase. It is described therein that the nitrogen concentration can be reduced in the second phase since the fuel tank contains a large amount of nitrogen gas in the first phase.

The aircraft fuel tank normally includes a tank (first fuel tank) provided across a fuselage portion and a pair of main wings, and a tank (second fuel tank) provided closer to the tip of each of the main wings than the first fuel tank. The NEA needs to be supplied to both the first fuel tank and the second fuel tank. However, no conventional art including U.S. Pat. No. 6,547,188 proposes a method for supplying the NEA to both of the first and second tanks. Aircraft is supplied with fuel for the next flight after landing. It is necessary to set the concentration of oxygen within each of the tanks to a prescribed value (e.g., 10% or less) before fueling. It is easily inferred that the oxygen concentration can be set to the prescribed value by supplying the NEA into each of the tanks. However, it takes time and labor to supply the NEA so as to set the oxygen concentration within each of the tanks to the prescribed value.

Thus, an object of the present invention is to provide an NEA supply system which easily maintains low the concentration of oxygen within a tank before fueling.

SUMMARY OF THE INVENTION

In view of the above object, a nitrogen enriched air (referred to as NEA below) supply system according to the present invention includes: a fuel tank provided in an aircraft, the fuel tank including a first fuel tank, and a second fuel tank arranged adjacent to the first fuel tank; a nitrogen enrichment module that produces NEA upon supply of source gas obtained in the aircraft; a first gas pipe that supplies the NEA toward the first fuel tank from the nitrogen enrichment module; a spill-back pipe that is arranged across the first fuel tank and the second fuel tank to cause fuel in the second fuel tank to flow into the first fuel tank; and a second gas pipe that directly or indirectly supplies the NEA to the spill-back pipe.

The first gas pipe and the second gas pipe may be provided independently of each other. Alternatively, for example, the second gas pipe may be provided branching from the first gas pipe.

After the aircraft lands, the fuel tank is supplied with fuel (is fueled) for the next flight. At this point, the second fuel tank is normally supplied with fuel first. Air existing within an internal space of the second fuel tank is thereby pushed out by the supplied fuel, and flows into the first fuel tank through the spill-back pipe. The concentration of oxygen within the first fuel tank may thereby exceed a prescribed value. Thus, it is necessary to set the concentration of oxygen within the second fuel tank to a sufficiently low level at the time of landing.

When the fuel in the first fuel tank is transferred to the second fuel tank and then supplied to the engine from the second fuel tank, the spill-back pipe is provided so as to cause the fuel in the second fuel tank to flow into the first fuel tank to avoid excessive transfer of the fuel to the second fuel tank. When the aircraft flies for many hours and the fuel tank is almost empty in, for example, a descent phase, the fuel does not flow through the spill-back pipe. Thus, the spill-back pipe comes to work only as a passage that connects the first fuel tank and the second fuel tank so as to allow air to pass therethrough. The present inventors have focused on use of the passage that allows air to pass therethrough. That is, the NEA is actively supplied to the second fuel tank through the spill-back pipe during the flight of the aircraft, typically, during descending, thereby suppressing the concentration of oxygen within the second fuel tank. Accordingly, even when the NEA is pushed out into the first fuel tank from the second fuel tank during fueling, the concentration of oxygen within the first fuel tank is not increased. Moreover, in the present invention, since the NEA pushed out into the first fuel tank from the second fuel tank during fueling is used, it is not necessary to separately supply the NEA before fueling.

In the present invention, the NEA supply system may further include: a bypass pipe that penetrates a boundary between the first fuel tank and the second fuel tank and detours through inside of the first fuel tank with an inlet and an outlet for the fuel provided in the second fuel tank; a pump that is provided on the bypass pipe to pump the fuel toward the outlet from the inlet; an ejector that feeds the fuel in the first fuel tank into the bypass pipe by using as a drive source the pumping of the fuel by the pump; and a fuel supply pipe that branches from the bypass pipe and supplies the fuel pumped by the pump to an engine.

In accordance with the above pipe configuration, the single pump provided on the bypass pipe can feed the fuel in the first fuel tank into the second fuel tank through the bypass pipe by use of the ejector. The fuel can be also supplied to the engine through the fuel supply pipe.

In the present invention, the spill-back pipe may be set such that an inlet for the fuel is at a higher position than an outlet for the fuel within an assumed range of a climb angle of the aircraft.

By setting the positional relationship between the inlet and the outlet as described above, it is possible to avoid the risk that the fuel does not flow toward the first fuel tank from the second fuel tank, or the risk that the fuel flows back toward the second fuel tank from the first fuel tank.

The present invention also provides an aircraft including an NEA supply system described above.

The present invention can provide the nitrogen enriched air supply system which can reduce the content of oxygen within the fuel tank, particularly in the first fuel tank without separately supplying the NEA to the fuel tank before fueling.

BRIEF DESCRIPTION OF THE DRAWINGS

FIGS. 2A and 2C show an ascent phase and a cruising phase; and FIG. 2B shows a descent phase; FIG. 3A shows a state in which the aircraft flies horizontally; and FIG. 3B shows a state in which the aircraft ascends.

DETAILED DESCRIPTION OF THE PREFERRED EMBODIMENT

In the following, a nitrogen enriched air (referred to as NEA below) supply system for an aircraft according to the present invention is described in detail based on an embodiment shown in the accompanying drawings.

Figure 1:
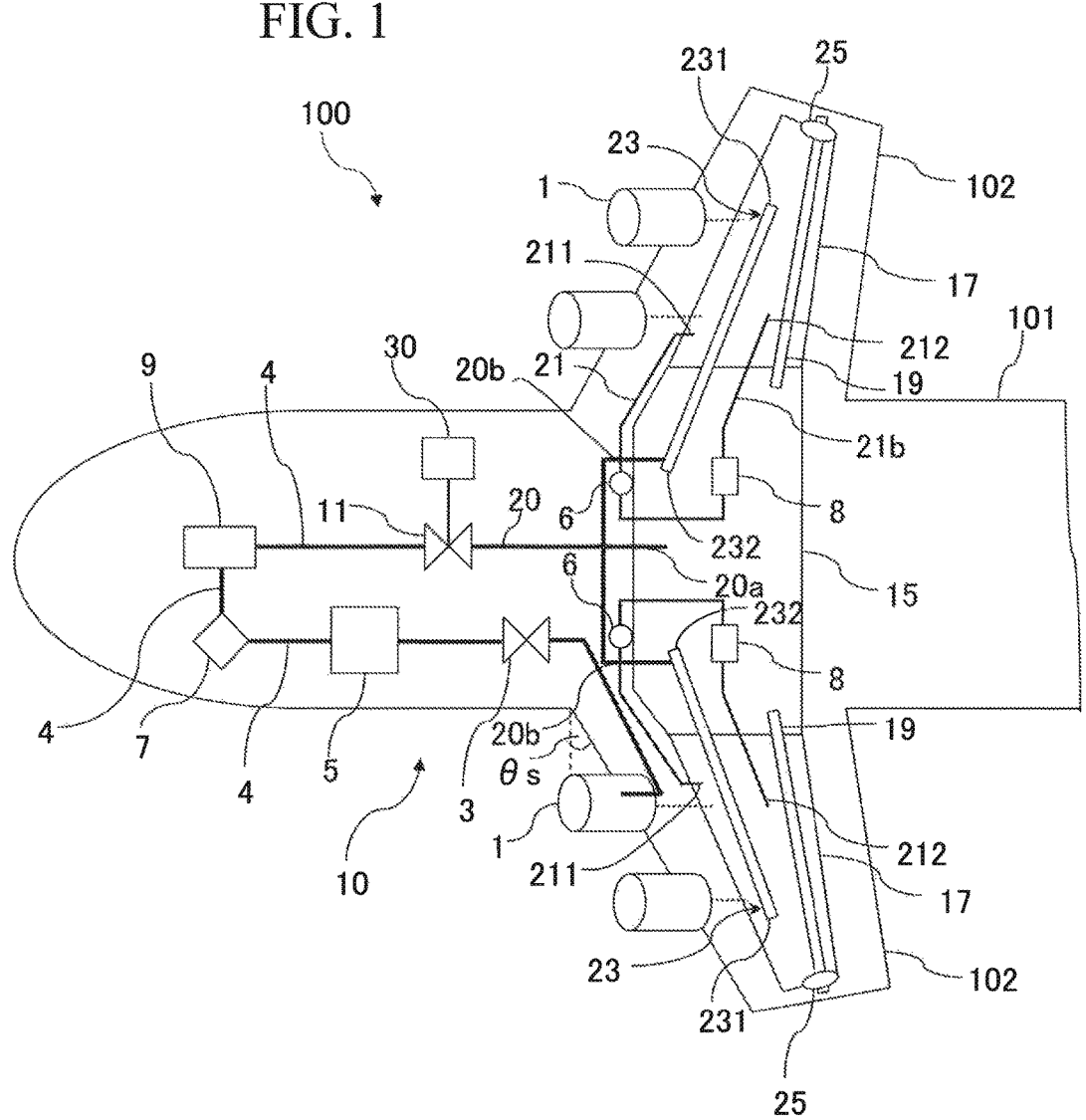
FIG. 1 is a view illustrating a schematic configuration of an aircraft according to a present embodiment.

As shown in FIG. 1, an aircraft 100 includes a pair of right and left main wings 102, an aircraft fuselage 101 to which the main wings 102 are mounted, a first fuel tank 15 provided across the fuselage 101 and the main wings 102, and a second fuel tank 17 provided in each of the main wings 102. A vent pipe 19, bypass pipe 21, and a spill-back pipe 23 are provided between the first fuel tank 15 and one of the second fuel tanks 17, and another vent pipe 19, another bypass pipe 21, and another spill-back pipe 23 are provided between the first fuel tank 15 and the other second fuel tanks 17, so as to penetrate the boundary between them. In general, fuel F is supplied to an engine 1 from the first fuel tank 15, and thereafter from the second fuel tank 17.

The first fuel tank 15 may be provided only in the fuselage 101.

The vent pipes 19 are provided so as to adjust the internal pressures of the first fuel tank 15 and the second fuel tank 17. Air is introduced and discharged through the vent pipes 19. For example, when the external atmospheric pressure is lowered along with an increase in the altitude of the aircraft 100, air occupying internal spaces of the first fuel tank 15 and the second fuel tank 17 is correspondingly discharged outside the aircraft through the vent pipes 19, thereby lowering the internal pressures of the fuel tanks. When the aircraft 100 descends, the opposite operation is performed.

Figure 2A:
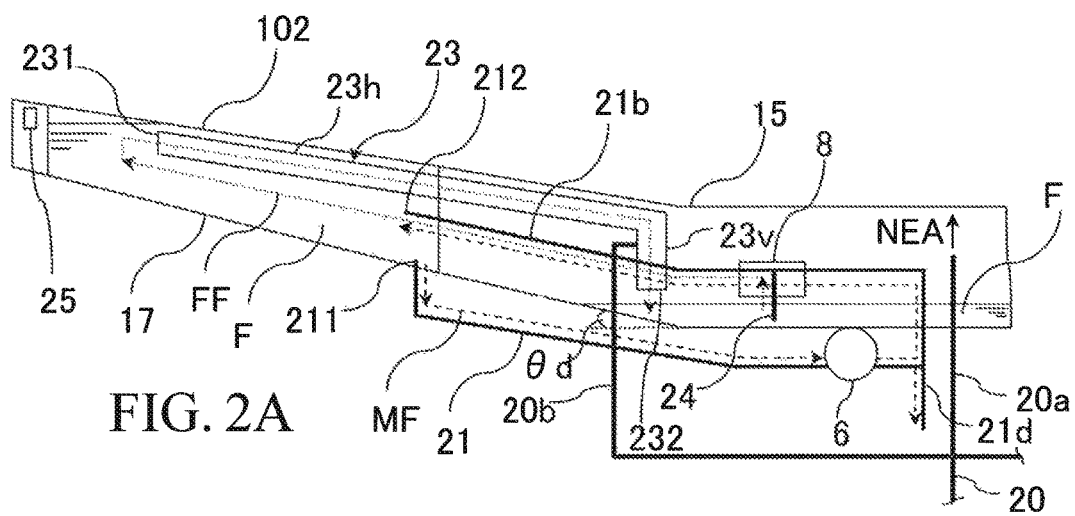
FIGS. 2A to 2C are front views of a fuel tank of the aircraft according to the present embodiment.
Figure 2B:
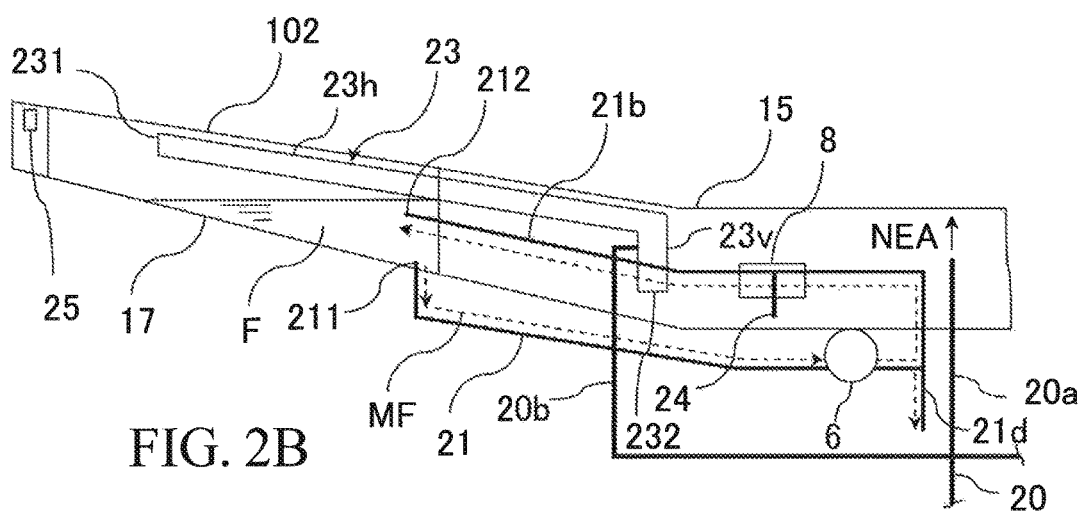

As shown in FIGS. 2A and 2B, each of the bypass pipes 21 includes an inlet 211 and an outlet 212 for the fuel F, which are both arranged in the second fuel tank 17. A pipe body 21b thereof enters the first fuel tank 15 by penetrating a boundary between the second fuel tank 17 and the first fuel tank 15, detours through the inside of the first fuel tank 15, and returns to the second fuel tank 17 by penetrating the boundary again. The bypass pipe 21 is partially depicted outside of the first fuel tank 15 and the second fuel tank 17 for ease of drawing.

The spill-back pipes 23 are provided so as to transfer excessive fuel F in the second fuel tank 17 to the first fuel tank 15. While an inlet 231 for the fuel F is arranged in the second fuel tank 17, an outlet 232 of the spill-back pipe 23 is arranged in the first fuel tank 15. The spill-back pipe 23 includes a main section 23h that extends straight from the inlet 231, and a hanging section 23v that extends to the outlet 232 from the main section 23h. The spill-back pipe 23 thereby forms an L shape. The main section 23h is arranged along the longitudinal direction of the main wing 102, and the hanging section 23v is directed vertically when the aircraft 100 flies horizontally. Since the main wing 102 has a dihedral angle θd with respect to the fuselage 101, the outlet 232 of the spill-back pipe 23 is located lower than the inlet 231 thereof when the aircraft 100 is maintained horizontally. Thus, when the inlet 231 is immersed in the fuel F, the fuel F flows toward the outlet 232 by gravity.

Next, an NEA supply system 10 according to the present embodiment is described.

The NEA supply system 10 supplies NEA to the first fuel tank 15, and further to the second fuel tank 17 through the spill-back pipe 23 to thereby prevent explosion of fuel.

The NEA supply system 10 includes a gas pipe 4 that guides bleed air from the engine 1. An on-off valve 3, a temperature regulation mechanism 5, a filter 7, an air separation module (ASM) 9, and a flow control valve (FCV) 11 are sequentially disposed on the gas pipe 4. The gas pipe 4 also includes a main pipe 20 connected to the downstream side of the FCV 11, and subsidiary pipes 20a and 20b that branch downstream of the main pipe 20. Thus, the bleed air from the engine 1 is turned into the NEA after passing through the respective devices in the above order from the on-off valve 3 via the gas pipe 4. The NEA is partially supplied to the first fuel tank 15 through the subsidiary pipe 20a. The NEA can be also partially supplied to the spill-back pipe 23 through the subsidiary pipe 20b.

Although the bleed air is obtained from the engine 1 as source gas for producing the NEA, the bleed air may be also obtained from another device that discharges gas, such as an auxiliary power unit and a compressor.

Also, the example in which the main pipe 20 branches into the subsidiary pipes 20a and 20b is described in the present embodiment. However, for example, three pipes may be provided extending from the FCV 11 such that one of the pipes is assigned to the first fuel tank 15, and the other two pipes are assigned to the spill-back pipes 23.

The flow of the bleed air from the engine 1 is described in more detail.

Air compressed within the engine 1 that generates a thrust for the aircraft 100 is partially removed as the bleed air, and guided to the on-off valve 3 through the gas pipe 4. Subsequently, the bleed air is guided to the temperature regulation mechanism 5, where the temperature of the bleed air is regulated. The bleed air then passes through the filter 7, and is guided to the ASM 9.

The temperature regulation mechanism 5 controls the temperature of the bleed air guided to the ASM 9 so as to optimize oxygen removal efficiency since the oxygen removal efficiency of the ASM 9 is related to the temperature. As an example, while the ASM 9 operates efficiently at a temperature ranging from 180° F. to 200° F. (about 82° C. to about 93° C.), the temperature of the bleed air from the engine 1 is 300° F. to 500° F. (about 149° C. to about 260° C.). Therefore, the bleed air from the engine 1 is cooled in the temperature regulation mechanism 5. A heat exchanger is employed as the temperature regulation mechanism 5. The atmosphere introduced from around the aircraft 100, or cold air obtained by an air conditioner provided in the aircraft 100 may be used as a cooling medium of the heat exchanger. It goes without saying that the heat exchanger is merely an example, and another cooling means may be also employed.

The filter 7 removes a substance that contaminates the ASM 9. If the contaminant is not removed by the filter 7, a polymer membrane constituting the ASM 9 is clogged, and resultantly cannot separate oxygen properly. Thus, desired NEA cannot be obtained.

The ASM 9 includes a hollow fiber polymer membrane as a main constituent element. The NEA is obtained by using a property that oxygen gas permeates through the hollow fiber wall several times more easily than nitrogen gas. That is, when the bleed air passes through the ASM 9, the bleed air is separated into two types of gasses, one of which is oxygen enriched air with a high oxygen concentration produced by permeation through the hollow fiber wall, and the other of which is the NEA produced by passing through the hollow fiber. The ASM 9 including the hollow fiber polymer membrane as the main constituent element is merely an example, and a wide variety of modules that exert the above function, such as an ASM using an oxygen-absorbing polymer membrane, may be applied in the present invention.

The obtained NEA is supplied to the first fuel tank 15 and the spill-back pipe 23 through the main pipe 20 by the opening/closing operation of the FCV 11. The opening/closing operation of the FCV 11 is controlled by a control unit 30. The opening/closing operation includes regulation of an opening degree. When the opening degree of the FCV 11 is increased, more bleed air is supplied to the ASM 9, so that more NEA can be supplied to the first fuel tank 15 and the spill-back pipe 23.

The NEA supply system 10 includes an altimeter and a residual fuel detector (not shown) so as to allow the control unit 30 to control the opening/closing operation of the FCV 11. The control unit 30 controls the opening/closing operation of the FCV 11 based on information regarding the altitude detected by the altimeter, and information obtained from the residual fuel detector provided in the fuel tank.

The control unit 30 holds information on the external atmospheric pressure for the altitude, and information regarding the total capacity of the first fuel tank 15.

Next, the mechanism for supplying the NEA to the first fuel tank 15 and the spill-back pipe 23 is described by reference to FIGS. 2A to 2C.

As shown in FIG. 2A, the subsidiary pipe 20b is connected to the hanging section 23v of the spill-back pipe 23. Thus, the NEA can be supplied to the spill-back pipe 23 through the main pipe 20 and the subsidiary pipe 20b.

A pump 6 and an ejector 8 are also disposed on the bypass pipe 21 sequentially from the inlet 211. Although the pump 6 is depicted outside of the first fuel tank 15 for ease of drawing in FIGS. 2A to 2C, the pump 6 may be arranged in the first fuel tank 15. The ejector 8 is arranged in the first fuel tank 15.

The pump 6 sucks the fuel F in the second fuel tank 17 from the inlet 211 of the bypass pipe 21, and pumps the fuel F toward the outlet 212. The sucked fuel F is discharged into the second fuel tank 17 from the outlet 212 through the pipe body 21b arranged in the first fuel tank 15. The flow of the fuel F is indicated by a dashed arrow MF. During the process, the fuel F passing through the bypass pipe 21 mainly flows into a branch section 21d to be supplied to the engine 1, and the remaining fuel F flows toward the ejector 8.

The ejector 8 includes a suction pipe 24. The distal end of the suction pipe 24 is immersed in the fuel F within the first fuel tank 15. The ejector 8 sucks the fuel F in the first fuel tank 15 from the suction pipe 24 when the fuel F pumped by the pump 6 and having a predetermined velocity passes through the ejector 8. The sucked fuel F is fed into the second fuel tank 17 via the outlet 212 together with the fuel F sucked from the second fuel tank 17. The ejector 8 functions to transfer the fuel F in the first fuel tank 15 to the second fuel tank 17 as described above.

The ejector is a well-known fluid compressor that reduces the pressure of a high-pressure fluid by accelerating the fluid, thereby sucks an external fluid, and then decelerates and raises the pressure of the fluid by a diffuser.

When the fuel F is transferred to the second fuel tank 17 from the first fuel tank 15 as described above, the fuel F may be excessively supplied to the second fuel tank 17 in an amount exceeding a given amount. The spill-back pipe 23 is provided in an upper portion of the main wing 102, and the position of the inlet 231 is set to be higher than that of the outlet 232. Thus, the excessive fuel F in the second fuel tank 17 is returned to the first fuel tank 15 through the spill-back pipe 23. The passage for the fuel F is indicated by a dotted arrow FF.

When a relatively small amount of fuel F is consumed in an ascent phase and a cruising phase of the aircraft 100, the fuel F remains in both of the first fuel tank 15 and the second fuel tank 17 as shown in FIG. 2A.

In this case, the pump 6 is operated at power in consideration of the supply of the fuel F to the ejector 8 in addition to the power of the engine 1. Thus, while the fuel F in the first fuel tank 15 is transferred to the second fuel tank 17 by the action of the ejector 8, the fuel F is returned to the first fuel tank 15 through the spill-back pipe 23 when the fuel F is transferred in an amount exceeding a given amount.

When the fuel F remains in both fuel tanks, the NEA is partially supplied to the first fuel tank 15 through the subsidiary pipe 20a. The internal space of the first fuel tank 15 is filled with the NEA. Meanwhile, the NEA flowing through the subsidiary pipe 20b is mixed with the fuel F flowing through the spill-back pipe 23, and supplied to the first fuel tank 15 from the outlet 232. Means for preventing the fuel F from flowing into the subsidiary pipe 20b, such as a one-way valve, may be provided in the subsidiary pipe 20b.

Meanwhile, when the aircraft flies for many hours and consumes much fuel in a descent phase, the fuel F remains in the second fuel tank 17, but remains in an amount not enough to be supplied to the first fuel tank 15, for example, as shown in FIG. 2B.

In this case, the fuel F is not transferred to the second fuel tank 17 from the first fuel tank 15, so that the fuel F in the second fuel tank 17 is not returned to the first fuel tank 15 through the spill-back pipe 23. Moreover, in this case, the liquid level of the fuel F in the second fuel tank 17 is reduced to below the inlet 231 of the spill-back pipe 23. Thus, when the fuel F does not remain in the first fuel tank 15 as in the descent phase, gas can flow through the spill-back pipe 23 between the spaces of the first fuel tank 15 and the second fuel tank 17.

In the descent phase, the atmospheric pressure becomes higher as the flight altitude of the aircraft is lowered. Thus, outside air is introduced into the first fuel tank 15 through the vent pipe 19, and the outside air introduced into the first fuel tank 15 is partially caused to flow into the second fuel tank 17 through the spill-back pipe 23. Accordingly, the pressure within both fuel tanks can be balanced with the external atmospheric pressure.

Meanwhile, the NEA flowing through the subsidiary pipe 20b is supplied toward the second fuel tank 17 since the spill-back pipe 23 allows air to pass therethrough. The NEA is thereby stored in the second fuel tank 17 in the descent phase, so that the concentration of oxygen can be restricted to low level.

After the aircraft 100 lands through the descent phase, the aircraft 100 is fueled for the next flight. The second fuel tank 17 is fueled first, and the first fuel tank 15 is then fueled.

As described above, the NEA is stored in the second fuel tank 17 at the time of landing. Thus, when the second fuel tank 17 is fueled, the stored NEA is pushed out by the fuel F, and flows into the first fuel tank 15 through the spill-back pipe 23. Accordingly, the concentration of oxygen within the first fuel tank 15 can be also maintained low.

Meanwhile, if the NEA is not supplied to the second fuel tank 17 in the descent phase, the second fuel tank 17 has a high oxygen concentration after landing due to the outside air introduced therein. Thus, when the second fuel tank 17 is fueled, the air with a high oxygen concentration is pushed out into the first fuel tank 15 from the second fuel tank 17. The oxygen concentration within the first fuel tank 15 may thereby exceed a prescribed value.

As described above, in the present embodiment, the NEA is supplied to the second fuel tank 17 in the descent phase. Accordingly, it is possible to cut out the need for supplying the NEA before fueling, and thereby fuel the fuel tank while avoiding fuel explosion.

Since the NEA is supplied to the second fuel tank 17 through the spill-back pipe 23 in the descent phase, the pressure within the second fuel tank 17 is increased. Entrance of the atmosphere from a vent port 25 is thereby suppressed. Accordingly, outside air can be prevented from being unnecessarily supplied to the first fuel tank 15 through the spill-back pipe 23.

In the present embodiment, since the tank that directly supplies the fuel F to the engine 1 is limited to the second fuel tank 17 by using the bypass pipe 21, only one pump 6 needs to be provided. As compared to a case in which the pump 6 is prepared for each of the first fuel tank 15 and the second fuel tank 17 so as to feed the fuel into the engine 1, the manufacturing cost of the aircraft 100 can be reduced, and the weight of the aircraft 100 can be also reduced to improve the fuel efficiency.

Since a sweepback angle ($\theta$s in FIG. 1) is provided in the main wing 102 of the aircraft 100, the spill-back pipe 23 needs to be arranged in consideration thereof. This point is described using FIGS. 3A and 3B.

Figure 3A:
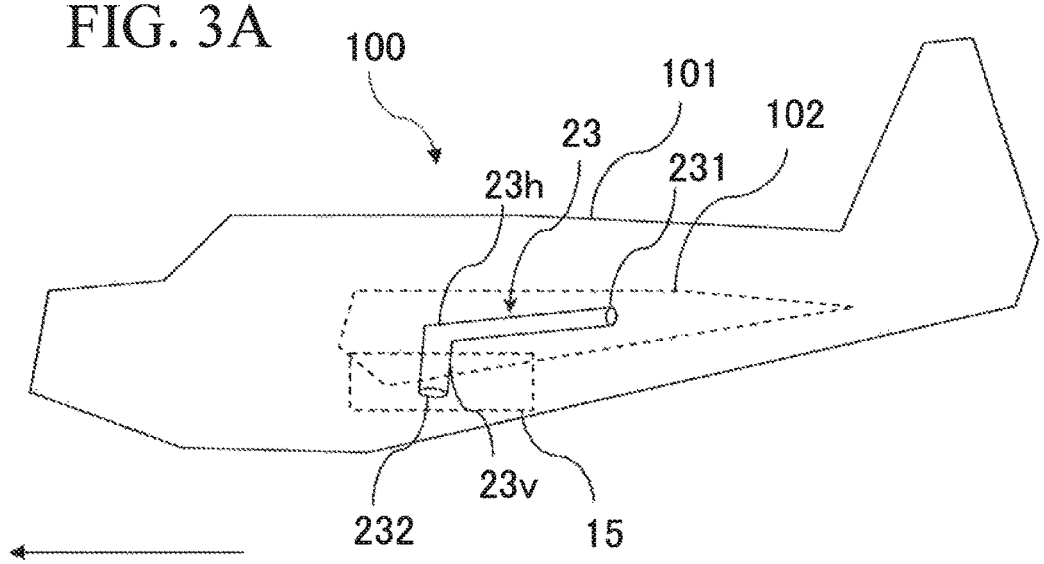
FIGS. 3A and 3B are side views of the aircraft according to the present embodiment.
Figure 3B:
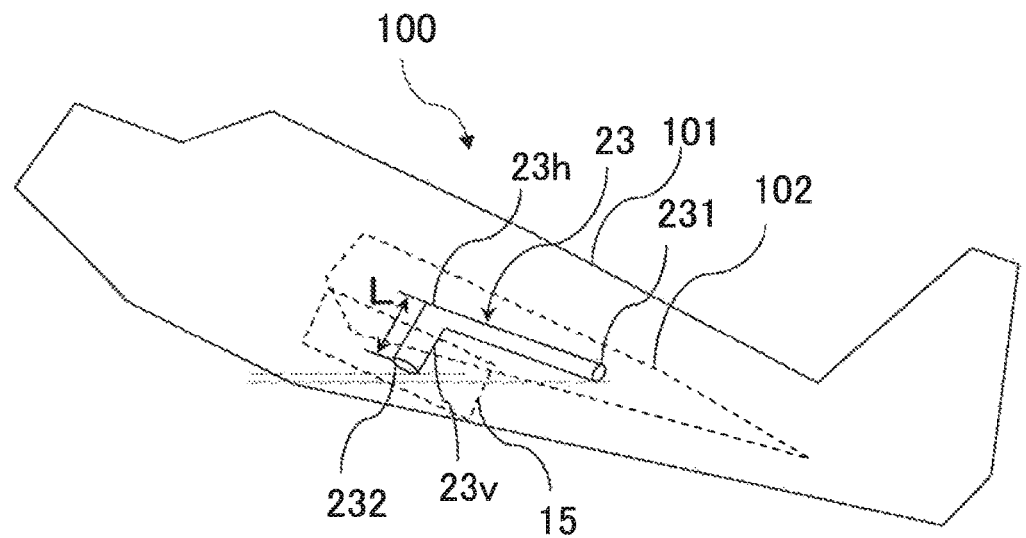

As shown in FIGS. 3A and 3B, the inlet 231 of the spill-back pipe 23 is located posterior to the outlet 232 in a traveling direction. This is because the sweepback angle $\theta$s is provided in the main wing 102. In general, the sweepback angle $\theta$ is set to be increased as the aircraft 100 (the main wing 102) becomes larger.

When the aircraft 100 flies or runs in a horizontal state as shown in FIG. 3A, the position of the inlet 231 is always higher than that of the outlet 232. This is because of the dihedral angle $\theta$d ($\theta$d in FIG. 2A) described above. The same applies even when the hanging section 23v is not provided.

Meanwhile, when the climb angle of the aircraft 100 is increased as shown in FIG. 3B, the position of the outlet 232 may become higher than that of the inlet 231. When the positions of the inlet 231 and the outlet 232 are reversed, the fuel F does not flow toward the first fuel tank 15 from the second fuel tank 17, or in an extreme case, the fuel F may flow back toward the second fuel tank 17 from the first fuel tank 15. If the fuel is forced to flow, high load is applied to the pump 6.

Thus, it is desirable to set the height positions of the inlet 231 and the outlet 232 such that the fuel F flows from the inlet 231 toward the outlet 232 (referred to as flow in a forward direction below) within an assumed range of the climb angle of the aircraft 100.

In the present embodiment, the hanging section 23v is provided so as to ensure the flow in the forward direction. The flow in the forward direction can be reliably ensured by adjusting a length L of the hanging section 23v. That is, when the length L is short, the positions of the inlet 231 and the outlet 232 are easily reversed. It is thus important to ensure a sufficient length for the length L. The flow in the forward direction is also effectively ensured by adjusting the bend angle of the hanging section 23v with respect to the main section 23h, as well as adjusting the length L.

However, the hanging section 23v is not an essential feature of the present invention. The spill-back pipe 23 may be composed only of the main section 23h depending on the dihedral angle $\theta$d and the sweepback angle $\theta$s.

Although the preferable embodiment of the present invention has been described above, constitutions described in the embodiment described above may be also freely selected or changed into other constitutions without departing from the gist of the present invention.

Figure 2C:
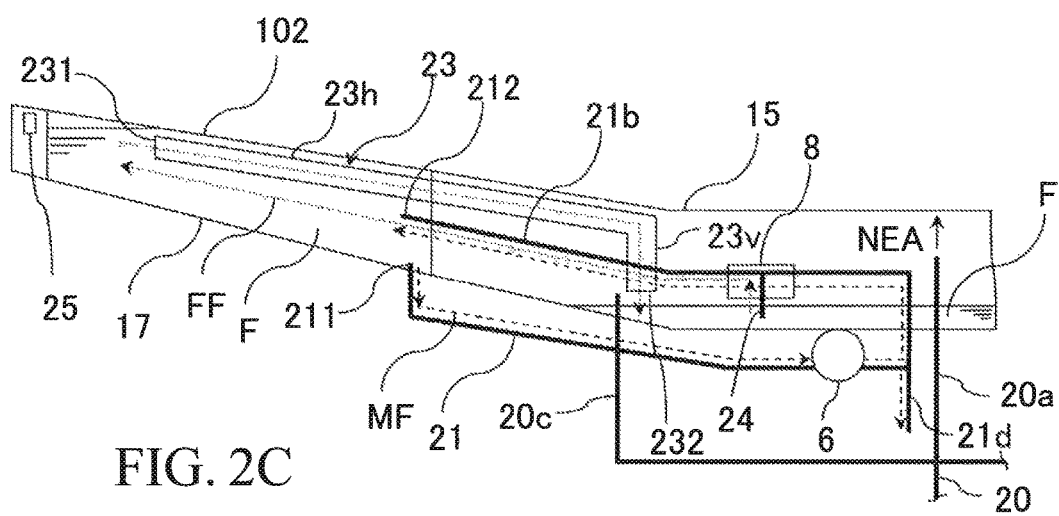

For example, although the example in which the subsidiary pipe 20b is directly connected to the spill-back pipe 23 has been described in the above embodiment, a subsidiary pipe 20c may be placed adjacent to the outlet 232 of the spill-back pipe 23 as shown in FIG. 2C. Since the NEA discharged from the subsidiary pipe 20c is partially supplied to the first fuel tank 15, it is necessary to supply the NEA in consideration thereof.

What is claimed is:

1. A nitrogen enriched air supply system comprising:
   a fuel tank provided in an aircraft, the fuel tank including a first tank, and a second tank arranged adjacent to the first tank;
   a nitrogen enrichment module that produces nitrogen enriched air upon supply of source gas obtained in the aircraft;
   a first gas pipe that supplies the nitrogen enriched air to the first tank from the nitrogen enrichment module;
   a spill-back pipe that is arranged between the first tank and the second tank to cause excessive fuel in the second tank to flow into the first tank, the spill-back pipe being configured such that fuel in the first tank is consumed first while setting an amount of fuel in the second tank at a given amount, wherein the spill-back pipe is set such that an inlet for the fuel is at a higher position than an outlet for the fuel within an assumed range of a climb angle of the aircraft;

a second gas pipe that directly or indirectly supplies the nitrogen enriched air to the spill-back pipe;

a bypass pipe that penetrates a boundary between the first tank and the second tank and passes through an inside of the first tank, the bypass pipe including an inlet and an outlet for the fuel, the inlet and the outlet of the bypass pipe being provided in the second tank;

a pump provided on the bypass pipe to pump the fuel toward the outlet from the inlet;

an ejector that feeds the fuel in the first tank into the bypass pipe by using, as a drive source, the pumping of the fuel by the pump; and a fuel supply pipe that branches from the bypass pipe and supplies the fuel pumped by the pump to an engine of the aircraft.

2. The nitrogen enriched air supply system according to claim 1, wherein the second gas pipe directly supplies the nitrogen enriched air to the spill-back pipe.

3. The nitrogen enriched air supply system according to claim 1, wherein
the spill-back pipe is configured to cause the excessive fuel in the second tank exceeding a predetermined height to overflow into the first tank.

4. The nitrogen enriched air supply system according to claim 1, further comprising:
a pump; and
a fuel pipe through which the fuel flows from the first tank into the second tank responsive to operation of the pump.

5. A nitrogen enriched air supply system comprising:
a fuel tank provided in an aircraft, the fuel tank including a first tank, and a second tank arranged adjacent to the first tank;
a nitrogen enrichment module that produces nitrogen enriched air upon supply of source gas obtained in the aircraft;
a first gas pipe that supplies the nitrogen enriched air to the first tank from the nitrogen enrichment module;
a spill-back pipe that is arranged between the first tank and the second tank to cause excessive fuel in the second tank to flow into the first tank, the spill-back pipe being configured such that fuel in the first tank is consumed first while setting an amount of fuel in the second tank at a given amount, wherein the spill-back pipe is set such that an inlet for the fuel is at a higher position than an outlet for the fuel within an assumed range of a climb angle of the aircraft; and
a second gas pipe that directly or indirectly supplies the nitrogen enriched air to the spill-back pipe;
wherein the nitrogen enriched air is supplied to the second tank via the second gas pipe and the spill-back pipe, in a descent phase of the aircraft.

6. The nitrogen enriched air supply system according to claim 5, wherein the source gas is a bleed air from an engine that generates a thrust for the aircraft.

7. The nitrogen enriched air supply system according to claim 5, wherein the second tank is arranged on a side of the first tank.

8. The nitrogen enriched air supply system according to claim 5, wherein the second gas pipe is branched from the first gas pipe.

9. The nitrogen enriched air supply system according to claim 5, wherein between the first tank and the second tank, fuel is delivered to an engine of the aircraft only from the second tank.

10. An aircraft comprising the nitrogen enriched air supply system according to claim 5.

11. A nitrogen enriched air supply system comprising:
a fuel tank provided in an aircraft, the fuel tank including a first tank, and a second tank arranged adjacent to the first tank;
a nitrogen enrichment module that produces nitrogen enriched air upon supply of source gas obtained in the aircraft;
a spill-back pipe that is arranged between the first tank and the second tank to cause excessive fuel in the second tank to flow into the first tank, the spill-back pipe being configured such that fuel in the first tank is consumed first while setting an amount of fuel in the second tank at a given amount, wherein the spill-back pipe is set such that an inlet for the fuel is at a higher position than an outlet for the fuel within an assumed range of a climb angle of the aircraft; and
a gas pipe that directly or indirectly supplies the nitrogen enriched air to the spill-back pipe, wherein
the nitrogen enriched air is supplied to the second tank via the gas pipe and the spill-back pipe, in a descent phase of the aircraft.

12. An aircraft comprising the nitrogen enriched air supply system according to claim 11.

13. The nitrogen enriched air supply system according to claim 11, wherein
the spill-back pipe is configured to cause the excessive fuel in the second tank exceeding a predetermined height to overflow into the first tank.

14. The nitrogen enriched air supply system according to claim 11, further comprising:
a pump; and
a fuel pipe through which the fuel flows from the first tank into the second tank responsive to operation of the pump.

15. A nitrogen enriched air supply system comprising:
a fuel tank provided in an aircraft, the fuel tank including a first tank, and a second tank arranged adjacent to the first tank;
a nitrogen enrichment module that produces nitrogen enriched air upon supply of source gas obtained in the aircraft;
a first gas pipe that supplies the nitrogen enriched air to the first tank from the nitrogen enrichment module;
a spill-back pipe that is arranged between the first tank and the second tank to cause fuel in the second tank to flow into the first tank; and
a second gas pipe that directly supplies the nitrogen enriched air to the spill-back pipe.

* * * * *

UNITED STATES PATENT AND TRADEMARK OFFICE
CERTIFICATE OF CORRECTION

PATENT NO. : 10,435,171 B2  
APPLICATION NO. : 14/070753  
DATED : October 8, 2019  
INVENTOR(S) : Koki Fukuda Page 1 of 1

It is certified that error appears in the above-identified patent and that said Letters Patent is hereby corrected as shown below:

On the Title Page

Item (57) ABSTRACT:
"To provide a nitrogen enriched air (NEA) supply system which easily maintains low the concentration of oxygen within a tank before fueling. In the present invention, a subsidiary pipe 20b that directly supplies NEA to a spillback pipe 23 is provided. In a descent phase of an aircraft, the NEA is supplied to a second fuel tank 17 from the subsidiary pipe 20b. When the second fuel tank 17 is fueled after landing, the stored NEA is pushed out into a first fuel tank 15 through the spill-back pipe 23 by fuel F. Thus, the concentration of oxygen within the first fuel tank 15 can be also maintained low. Accordingly, it is possible to cut out the need for supplying the NEA before fueling, and thereby fuel the fuel tank while avoiding fuel explosion." SHOULD BE -- A nitrogen enriched air (NEA) supply system which easily maintains low the concentration of oxygen within a tank before fueling. A subsidiary pipe that directly supplies NEA to a spillback pipe is provided. In a descent phase of an aircraft, the NEA is supplied to a second fuel tank from the subsidiary pipe. When the second fuel tank is fueled after landing, the stored NEA is pushed out into a first fuel tank through the spill-back pipe by fuel. Thus, the concentration of oxygen within the first fuel tank can be also maintained low. Accordingly, it is possible to cut out the need for supplying the NEA before fueling, and thereby fuel the fuel tank while avoiding fuel explosion. --.

Signed and Sealed this  
Eighteenth Day of February, 2020

Andrei Iancu  
*Director of the United States Patent and Trademark Office*